United States Patent
Becker

(10) Patent No.: US 11,906,019 B2
(45) Date of Patent: Feb. 20, 2024

(54) SWASH-PLATE-TYPE GEARING FOR ADJUSTMENT DEVICES

(71) Applicant: FISHER DYNAMICS GERMANY GMBH, Wuppertal (DE)

(72) Inventor: Hans Burckhard Becker, Solingen (DE)

(73) Assignee: FISHER DYNAMICS GERMANY GMBH, Wuppertal (DE)

( * ) Notice: Subject to any disclaimer, the term of this patent is extended or adjusted under 35 U.S.C. 154(b) by 0 days.

(21) Appl. No.: 17/772,010

(22) PCT Filed: Oct. 22, 2020

(86) PCT No.: PCT/EP2020/079733
§ 371 (c)(1),
(2) Date: Apr. 26, 2022

(87) PCT Pub. No.: WO2021/083781
PCT Pub. Date: May 6, 2021

(65) Prior Publication Data
US 2023/0003285 A1    Jan. 5, 2023

(30) Foreign Application Priority Data
Oct. 29, 2019 (DE) .................... 10 2019 129 197.6
Feb. 21, 2020 (DE) .................... 10 2020 104 597.2

(51) Int. Cl.
*F16H 19/08* (2006.01)
*B60N 2/225* (2006.01)
*B60N 2/02* (2006.01)

(52) U.S. Cl.
CPC .......... *F16H 19/08* (2013.01); *B60N 2/02246* (2023.08); *B60N 2/2252* (2013.01)

(58) Field of Classification Search
CPC .......... F16H 19/08; F16H 1/32; F16H 37/041; B60N 2/0232; B60N 2/2252; B60N 2/933
See application file for complete search history.

(56) References Cited

U.S. PATENT DOCUMENTS

| | | | |
|---|---|---|---|
| 3,562,851 A | 2/1971 | Koller | |
| 2010/0072725 A1* | 3/2010 | Woellhaf | F16H 37/041 254/362 |

(Continued)

FOREIGN PATENT DOCUMENTS

| | | |
|---|---|---|
| DE | 4437073 A1 | 1/1996 |
| DE | 102005057462 A1 | 6/2007 |

(Continued)

OTHER PUBLICATIONS

International Search Report dated Feb. 2, 2021 re: Application No. PCT/EP2020/079733, pp. 1-2, citing: DE 102011009036 B3, WO 2005025929 A1, U.S. Pat. No. 3,562,851 A and DE 102005057462 A1.

*Primary Examiner* — Justin Holmes
(74) *Attorney, Agent, or Firm* — CANTOR COLBURN LLP

(57) ABSTRACT

A swash-plate-type gearing for adjustment devices includes a housing; an outer part, which has an inner toothing concentric with a joint axis; and an inner part with an outer toothing concentric with an eccentric axis, which runs parallel to the joint axis, offset by an off-centre distance. The gearing also includes an engagement region, in which the outer toothing is engaged with the inner toothing and which is located on a straight line intersecting the joint axis and eccentric axis, in each case at a right angle, with the eccentric axis lying on this straight line between the joint axis and engagement region; and a free space located 180° opposite the engagement region and on the straight line, in which free space the outer toothing is disengaged from and (Continued)

at a distance from the inner toothing. A locking part is provided having a locking region located in the free space.

15 Claims, 2 Drawing Sheets

(56) References Cited

U.S. PATENT DOCUMENTS

2015/0337932 A1* 11/2015 Ta ........................ B60N 2/0232
  475/168
2019/0152347 A1* 5/2019 Becker .................... F16H 55/06

FOREIGN PATENT DOCUMENTS

| | | | | |
|---|---|---|---|---|
| DE | 102011009036 B3 * | 4/2012 | ........... | B60N 2/2252 |
| DE | 102011009036 B3 | 4/2012 | | |
| EP | 2406100 B1 * | 11/2016 | ........... | B60N 2/2252 |
| WO | 2005025929 A1 | 3/2005 | | |

* cited by examiner

SWASH-PLATE-TYPE GEARING FOR ADJUSTMENT DEVICES

TECHNICAL FIELD

The disclosure relates to a wobble mechanism for adjusting devices, in particular adjusting devices of motor vehicles seats, for example for backrest joints, according to the preamble of patent claim 1, as it is known from DE 44 37 073 A1.

BACKGROUND

Wobble mechanisms of this type have proven themselves for the adjustment of joints in motor vehicle seats, in particular for height adjustments.

A large advantage of mechanisms of this type is that they are self-locking. They lock in the return path of the force and have a high locking effect even in the case of forces, as they occur in particular in the event of accidents, and maintain said locking effect. Currently, the demands are that the mechanism can absorb torques of greater than or equal to 200 Nm.

In the case of such high torques, it has to in particular be ensured that the toothings, which engage, cannot become disengaged. This is where the disclosure starts.

SUMMARY

The disclosure has the object of avoiding the disadvantages of the known mechanisms and to further develop these mechanisms to the effect that they also withstand high torques acting in the return path of the force, and thus stresses due to accidents.

This object is solved by means of a wobble mechanism for adjusting devices, in particular of motor vehicle seats, having a housing; an outer part, which has an internal toothing, which is concentric with a joint axis; an inner part, which has an external toothing, which is concentric with an eccentric axis, which runs offset in parallel by an off-center distance e to the joint axis; an engagement region, in which the external toothing engages with the internal toothing and which is intersected centrally by a straight line, which in each case intersects the joint axis and the eccentric axis at a right angle, wherein on this straight line the eccentric axis lies between the joint axis and the engagement region; and a free space, which is located 180° opposite the engagement region and which is likewise intersected centrally by the straight line and in which the external toothing is disengaged and at a distance from the internal toothing, a locking part is provided, which has a locking region, which is located in the free space, thus engages with the latter.

In the case of this mechanism, the locking part is located with its locking region between the tip circles of the two toothings, namely in the free space, which is present between the internal toothing and the external toothing. This free space is limited by the two tip circles. It is essentially crescent-shaped. When the internal toothing wants to move away from the external toothing in the engagement region by means of external forces, this is not possible without reducing the free space. A reduction of this type, however, is blocked by the locking part. In the region of the free space, the teeth of the internal toothing and of the external toothing cannot approach one another to the extent that would be necessary, so that there is no longer an engagement in the engagement region. It is avoided by means of the locking part that the teeth in the free space can approach one another to such a sufficient extent or that the free space is radially decreased to such an extent, respectively, that the engagement as a whole is lost.

The locking part thus comes into operation in an accident situation. It should generally not be noticeable, for example should not rattle or negatively impact the actuation in some way.

The internal toothing has a smaller number of teeth than the external toothing. The difference preferably equals one or two.

In a manner known per se, the inner part has a circular recess, which is concentric with the eccentric axis and which is limited by a sliding surface. The wobble mechanism further has a wobble pin, which abuts on this sliding surface, is rotatably received in the recess, and is concentric with the eccentric axis. Due to the fact that the respective rotational position of the wobble pin determines the position of the free space, it is advantageous to connect the locking part to the wobble plate. Even though there are also other options for controlling the locking part so that the locking region thereof is always located in the free space, the connection to the wobble plate represents a particularly simple solution. A sliding movement between recess and wobble pin can also be replaced with a rolling friction, e.g. ball bearing. The mechanism can be manually or motor driven.

It is advantageous when the locking part has a main body, which, viewed in the direction of the joint axis, is arranged above or below the inner part.

In the plane of the toothings, the locking region can have an extension in the circumferential direction, so that it covers two to five teeth of the internal toothing and external toothing, in particular covers three or four teeth. It is ensured with this length that the teeth of the external toothing cannot engage with the internal toothing beyond the tip circle of the teeth of the internal toothing in the free space. The locking region covers at least one intermediate tooth space, which preferably lies on both sides of the straight line. It is prevented thereby that a tooth of the other toothing can enter into this intermediate space of the toothing.

When an air gap is in each case located in an advantageous manner between the locking region and the internal toothing as well as between the locking region and the external toothing, this has the advantage that a rattling of the locking part is prevented.

It is advantageous to form the locking region in a similar form as the crescent shape of the free space. It is advantageous when the locking region has tapering end regions in the plane of the internal toothing. In the axial direction, the locking region preferably extends over the axial thickness of the teeth of the internal toothing or of the external toothing, respectively.

The disclosure makes it possible that the housing and/or the wobble pin and/or mechanism parts are made of a plastic, in particular of a reinforced plastic, for example of glass fiber-reinforced plastic. The housing is relieved by means of the locking part. Housing and wobble pin (plus a drive wheel connected thereto) can deform elastically, the tolerances occurring thereby could have the result that, without locking part, the toothings become disengaged. This is now prevented by means of the locking part. The wobble pin preferably protrudes integrally from the drive wheel.

Measured in the free space and on the straight line, the distance between the tip circles of the two toothings is preferably larger than 1 mm. The free space should be sufficiently large so that the locking part can be accommodated there. It should be sufficiently small to attain a high translation.

Advantageously, the diameter of the tip circle of the internal toothing is maximally 5% larger than the diameter of the tip circle of the external toothing, the diameter of the tip circle of the internal toothing is in particular not larger than the diameter of the tip circle of the external toothing. A translation, which is as large as possible, is desired by means of the fitting. This is attained when the number of teeth of the toothings differ only by one. The translation, which is a large as possible, is also promoted in that the diameters of the two tip circles are approximately identical.

In preferred embodiment, the locking part is L-shaped. The locking region thereby represents a leg, which runs essentially parallel to the joint axis. The other leg is formed by a main body. A possible connection region between both of them forms the angle of 90°.

A single-stage wobble mechanism has been described so far. The disclosure can also be used in the case of a two-stage wobble mechanism, wherein only one wobble mechanism has a locking part or both wobble mechanisms have a common locking part.

BRIEF DESCRIPTION OF THE DRAWINGS

Further advantages and features follow from the claims as well as from the following description of an exemplary embodiment of the disclosure, which is not to be understood to be limiting. This will be explained and described in more detail below with reference to the drawing, in which:

DETAILED DESCRIPTION OF THE DRAWINGS

Figure 1:
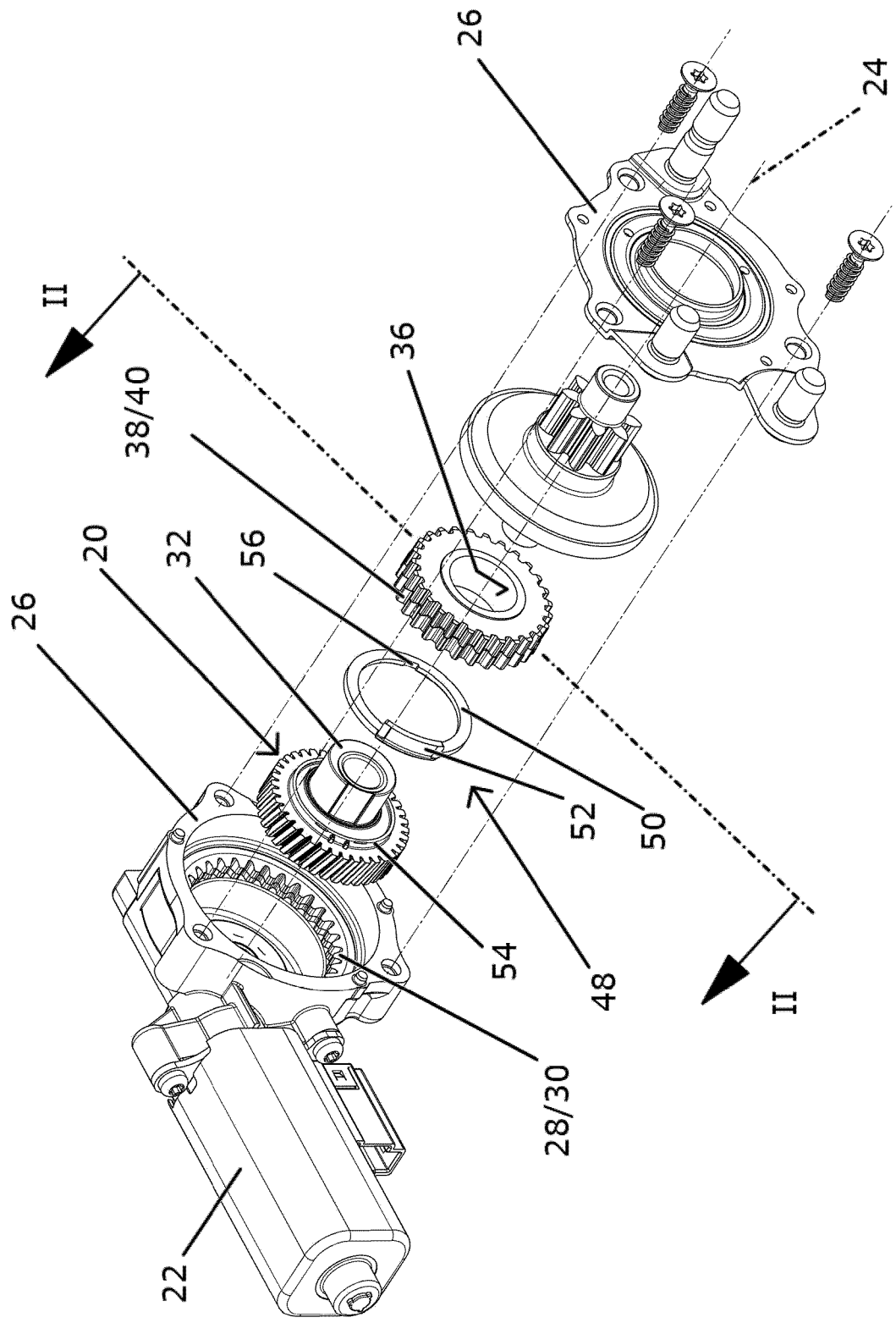
FIG. 1: shows an assembly diagram of a two-stage wobble mechanism.

A drive wheel 20 is driven by an electric motor 22. Said drive wheel thereby rotates about a joint axis 224. The latter is fixedly specified by a housing 26, which is formed in two parts here. An outer part 28 comprising internal toothing 30 is arranged or formed, respectively, in the housing 26.

The drive wheel 20 is fixedly connected to a wobble pin 32, which is arranged eccentrically. The latter is concentric with an eccentric axis 34. The latter runs parallel to the joint axis 24 and a distance e, this distance is referred to as off-center distance. In the known manner, the wobble pin 32 engages with a recess 36 of an inner part 38 comprising external toothing 40. Said external toothing 40 engages with the internal toothing 30. In response to rotation of the drive wheel 20, the eccentric axis 34 runs on a circular arc with the radius e about the joint axis 24. The inner part 38 is thus driven to perform a wobbling movement. In an engagement region 42, said inner part engages with the teeth of the internal toothing 30. It is disengaged in a free space 44 located diametrically opposite.

Figure 2:
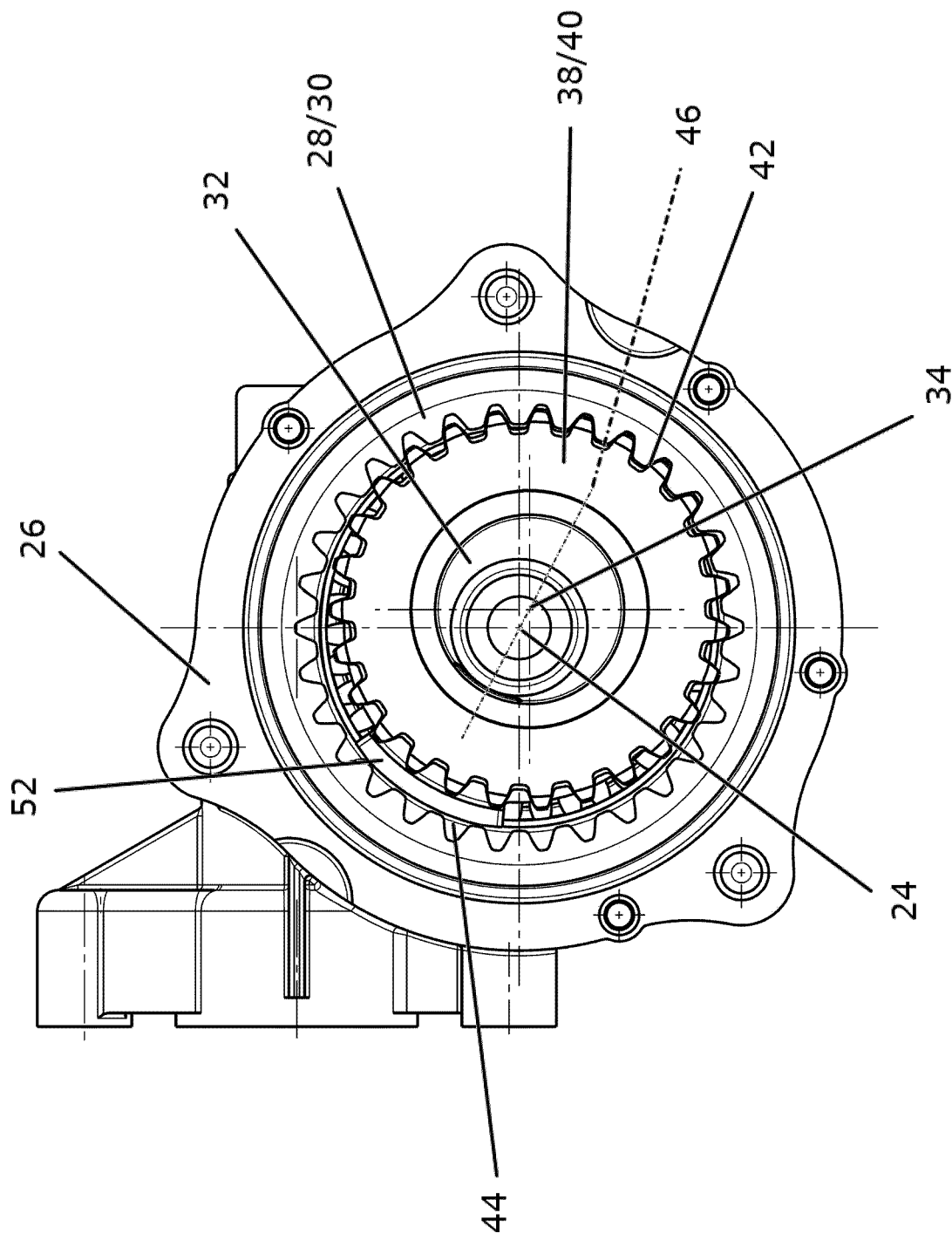
FIG. 2: shows a sectional view of an assembled wobble mechanism, viewed in terms of the sectional line II-II in FIG. 1.

The context becomes clearer in consideration of FIG. 2. There, a straight line 46 is plotted, which intersects the two axes 24, 34 at a right angle. During operation, this straight line 46 runs about the joint axis 24. This straight line 46 runs centrally through the engagement region 42. The point of intersection thereof with the eccentric axis 34 is located between the point of intersection thereof with the joint axis 24 and the engagement region 42. The free space 44 is located on both sides of the straight line 46. The joint axis 24 is always located between the free space 44 and the eccentric axis 34.

A locking part 48 is provided, it is located between the drive wheel 20 and the inner part 38. In the exemplary embodiment, it has a main body 50, which is formed as ring here, and a locking region 52. The latter is at a right angle to the plane of the ring-shaped main body 50 and runs on a circular arc, which is slightly smaller than the circular arc of the tooth tips of the internal toothing 30. In the radial direction, the locking region 52 has a dimension, which is not smaller than the width of the teeth of the toothings 30, 40. The locking region is located in the free space 44. It essentially fills said free space. In the exemplary embodiment, the locking region has an essentially constant material thickness in the circumferential direction, in an alternative, the material thickness can be smaller at the circumferential ends, in the style of the crescent shape. The locking part 48 is preferably a metallic part.

Around the wobble pin 32, the drive wheel 20 has a circumferential depression 54. The latter is adapted to the ring-shaped main body 50 and receives the latter. Mutually cooperating actuators 56 are present, so that the main body 50 is connected in a rotationally fixed manner to the drive wheel 20. The locking region 52 is thus always on the side of the joint axis 24 opposite the eccentric axis 34.

Not illustrated in an alternative, the locking part 48 is reduced essentially to the locking region 52 and protrudes from the drive wheel 20 in the axial direction, for example integrally, or the drive wheel 20 has a slot, which partially receives and supports the locking region 52. This is to show that a ring is not necessary.

In the exemplary embodiment, a second wobble stage is also shown. The latter is known from the prior art and thus does not need to be described. It also has a free space. It is possible to also secure this free space by means of the locking part 48.

In the shown exemplary embodiment, the axial length of the locking region 52 can be dimensioned so that it corresponds to the thickness of the teeth of the two inner parts.

The off-center distance e is determined by the distance, measured on the straight line 46, of the points of intersection of said straight line 46 with the two axes 24, 34.

The wobble mechanism for adjusting devices has a housing 26; an outer part 28, which has an internal toothing 30, which is concentric with a joint axis; an inner part 38, which has an external toothing 40, which is concentric with an eccentric axis 34, which runs offset in parallel by an off-center distance e to the joint axis 24; an engagement region 42, in which the external toothing 40 engages with the internal toothing 30 and which is located on a straight line 46, which in each case intersects the joint axis 24 and the eccentric axis 34 at a right angle, wherein on this straight line 46 the eccentric axis 34 lies between the joint axis 24 and the engagement region 42; and a free space 44, which is located 180° opposite the engagement region 42 and which is likewise located on the straight line 46 and in which the external toothing 40 is disengaged and at a distance from the internal toothing 40 30. A locking part 48 is provided, which has a locking region 52, which is located in the free space 44.

Terms such as essentially, preferably, and the like as well as information, which might be understood to be unprecise, are to be understood in such a way that a deviation by plus-minus 5%, preferably plus-minus 2%, and in particular plus-minus one percent from the normal value is possible. Applicant reserves the right to combine any features and also sub-features from the claims and/or any features and also partial features from a sentence of the description in any way with other features, sub-features or partial features, also outside of the features of independent claims. Applicant furthermore reserves the right to delete any features and also partial features.

Parts, which are identical with regard to their function, are always also provided with the same reference numerals in the different figures, so that they are generally described only once.

The invention claimed is:

1. A wobble mechanism for adjusting devices comprises:
a housing,
an outer part, having an internal toothing, which is concentric with a joint axis,
an inner part, having an external toothing, which is concentric with an eccentric axis, which runs offset in parallel by an off-center distance to the joint axis,
an engagement region, in which the external toothing engages with the internal toothing and which is located on a straight line, which in each case intersects the joint axis and the eccentric axis at a right angle, wherein on this straight line the eccentric axis lies between the joint axis and the engagement region, and
a free space located 180° opposite the engagement region and is likewise located on the straight line and in which the external toothing is disengaged and at a distance from the internal toothing,
wherein a locking part is provided, said locked part having a locking region, which is located in the free space,
wherein the inner part has a circular recess that is concentric with the eccentric axis and which is limited by a sliding surface, that the wobble mechanism further has a wobble pin that abuts on the sliding surface and is rotatably received in the recess, and that the rotational movement of the locking part is synchronized with the rotational movement of the wobble pin, wherein said wobble mechanism has a drive wheel, which is concentric with the joint axis and which is connected to the wobble pin, and that the locking part is arranged on the drive wheel and rotates with the drive wheel.

2. The wobble mechanism according to claim 1, wherein the locking region is rotatably arranged about the joint axis.

3. The wobble mechanism according to claim 1, wherein the locking region extends in the radial direction.

4. The wobble mechanism according to claim 1, wherein the locking part has a main body and the locking region, and that the locking region runs at a right angle to the main body.

5. The wobble mechanism according to claim 4, wherein the main body has a ring that is concentric with the joint axis.

6. The wobble mechanism according to claim 1, wherein the drive wheel has a depression (54), into which the locking part is inserted, wherein either the depression is ring-shaped and concentric with the joint axis or is adapted to the circumferential dimension of the locking region, which radially protrudes from the depression, in the circumferential direction.

7. The wobble mechanism according to claim 1, wherein the drive wheel and the locking part have mutually cooperating actuators.

8. The wobble mechanism according to claim 1, further including a second wobble stage, and that the locking region is located in at least one of the free spaces of the first and second wobble stage.

9. The wobble mechanism according to claim 1, wherein the locking region covers two to five teeth of the internal toothing or external toothing.

10. The wobble mechanism according to claim 1, wherein an air gap is in each case located between the locking region and the internal toothing and located between the locking region and the external toothing.

11. The wobble mechanism according to claim 1, wherein in the plane of the internal toothing, the locking region has end regions tapering in the circumferential direction.

12. The wobble mechanism according to claim 1, wherein the housing and/or the wobble pin and/or of the drive wheel are made of a plastic.

13. The wobble mechanism according to claim 1, wherein, measured in the free space and on the straight line, the distance between the tip circles of the two toothings is larger than 1 mm.

14. The wobble mechanism according to claim 1, wherein the difference between the diameter of the tip circle of the internal toothing and the diameter of the tip circle of the external toothing is less than 5%.

15. The wobble mechanism according to claim 1, wherein the free space is limited by the tip circles of the two toothings.

* * * * *